(No Model.)
N. BARRY, Jr.
PLUMBER'S TRAP.
No. 492,260. Patented Feb. 21, 1893.
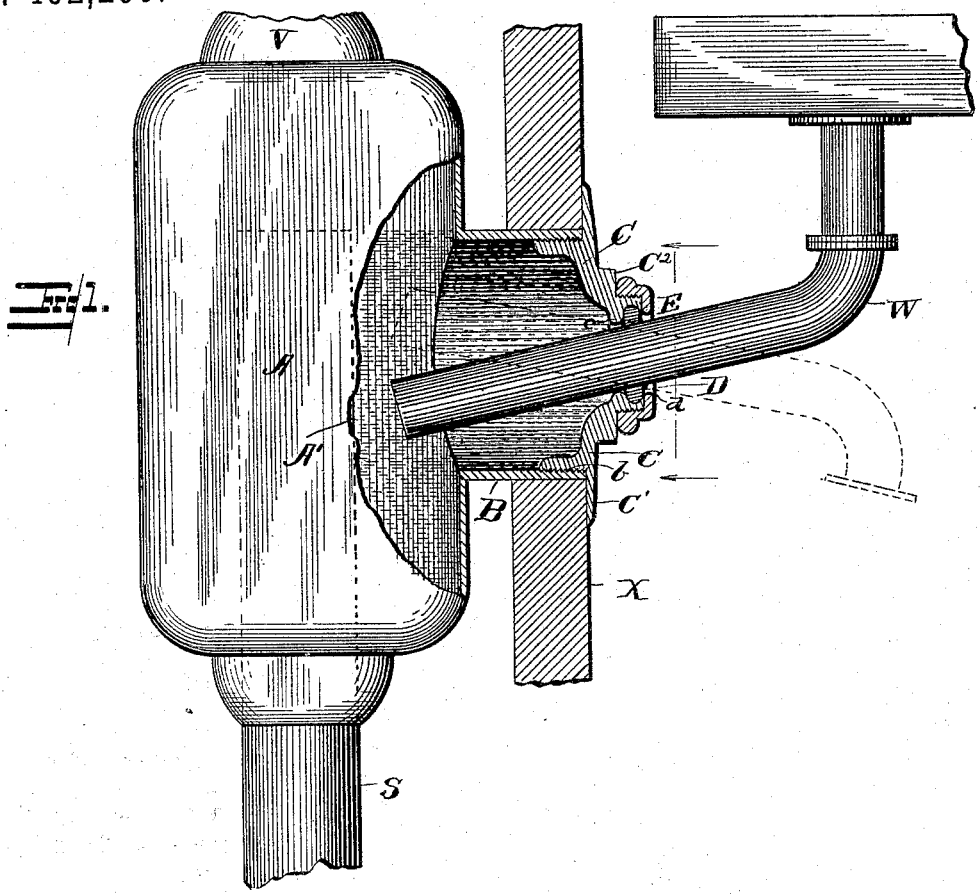
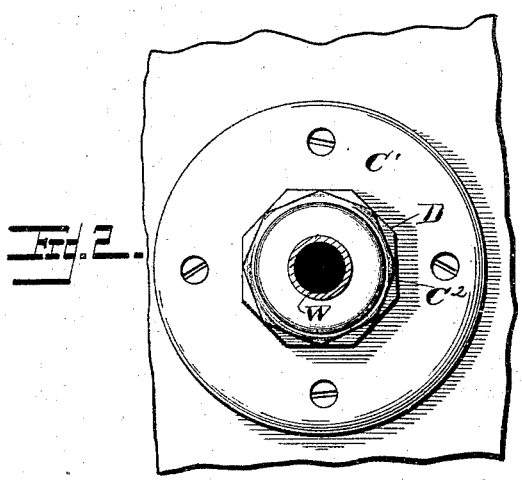
Witnesses:
J. M. Fowler
James R. Mansfield
Inventor
By Nicholas Barry Jr.
Alexander & Dowell
Attorneys.
THE NORRIS PETERS CO., PHOTO-LITHO., WASHINGTON, D. C.

UNITED STATES PATENT OFFICE.

NICHOLAS BARRY, JR., OF MUSCATINE, IOWA.

PLUMBER'S TRAP.

SPECIFICATION forming part of Letters Patent No. 492,260, dated February 21, 1893.

Application filed April 4, 1892. Serial No. 427,712. (No model.)

*To all whom it may concern:*

Be it known that I, NICHOLAS BARRY, Jr., of Muscatine, in the county of Muscatine and State of Iowa, have invented certain new and useful Improvements in Plumbers' Traps; and I do hereby declare that the following is a full, clear, and exact description thereof, reference being had to the accompanying drawings, and to the letters of reference marked thereon, which form part of this specification, in which—

Figure 1 is a partly side and partly a vertical sectional view of my improved water seal trap and connections. Fig. 2 is a detail view.

This invention is an improvement in water seal plumbers traps and its object is to provide an efficient easily constructed and concealed water seal trap, which can be placed behind wall or wainscoting and cleansed and with which the pipe connection can be quickly made.

To these ends the invention consists in the novel construction and combination of parts hereinafter described and stated concisely in the claims.

Referring to the drawings by letters; A designates the trap body formed preferably of a metallic cylinder having its ends closed, the upper end connected to a vent pipe V, and its lower end to the sewer pipe S. The trap stands vertical and has within it an upstanding pipe A' connecting at bottom with the sewer pipe and extending near to the upper end of the trap, so that water will stand in the trap exterior to the pipe A' to the height of said pipe. This trap has a hollow T B at its center, said portion being of a diameter almost if not quite equal to the diameter of the trap, and this T is screw-threaded interiorly as at $b$. C is a cap having an annular flange C' screw threaded exteriorly to engage the threaded end of part B as shown, forming a water tight joint therewith. This cap has a central opening surrounded by a flange the base $C^2$ of which is faceted, as indicated to enable the cap to be turned by a wrench, and the extremity of said flange is exteriorly screw threaded and is engaged by a packing ring D.

E is a packing of rubber or other yielding and expansive material interposed between the flange $d$ of ring D and an annular rib $c$ in the opening of the cap as shown.

This trap is especially designed for use where it is not desired to have the water seal or trap in the room, or where it is desired to conceal the trap, and in practical use the trap may be arranged exterior to the building, or in a partition thereof, and is supported in a vertical position by the T B which extends through an opening in the wall X as shown. The cap C is then screwed into the T making a close water tight joint therewith. The waste pipe W from the sink, closet &c., in the building is then passed through the opening in the cap (ring D having been previously slipped thereon) and is connected to the sink &c. After this connection is made, the packing E is slipped between the ring D and rib $c$, and the ring D screwed up, compressing the packing laterally and compelling it to make a close joint between the pipe and cap. The openings in the cap and ring are of larger diameter than the pipe so as to allow it to be adjusted slightly in any direction as indicated in the drawings, so that the pipe joints will not be strained in making the connections between waste pipe and trap, the packing E compensating for any slight deviation of the waste pipe from a direct line through the cap.

In some cases pipe A' might be removed from the inside of trap and the sewer pipe connected to an opening in the side of trap near the upper end thereof, so that the water will stand in trap in either case above the T or end of waste pipe.

In cleansing the trap the pipe W is disconnected from the sink &c., and is turned down as indicated in Fig. 1, thereby drawing off part of the water in the trap. Then pipe W may be removed and the rest of water in the trap withdrawn by any suitable means. Cap C can then be unscrewed and matters deposited in the trap removed without disturbing the waste or vent pipe connections, or removing the trap from its position. The water level of the seal in trap is above the top of T B and end of pipe W so that there is no danger of gas escaping into the dwelling through the trap. After cap C is screwed on the T, it can be fastened to the wall if desired by screws, &c. The trap while being concealed, is thus readily accessible for cleaning, or repairing without cutting into or removing the wall. The T B thus serves not only as a joint between the trap and waste pipes but also as a manhole for cleansing the trap and as a bracket for supporting the weight thereof.

Having described my invention, what I claim as new, and desire to secure by Letters Patent thereon, is—

1. The combination of a trap having a lateral T adapted to extend through a wall or partition and thereby support the trap and screw threaded interiorly, and a cap closing the end of said T having a central opening, with an adjustable inlet pipe entering through said opening and a packing ring and packing surrounding said pipe and screwing into the cap and an outlet pipe from the trap communicating with the interior thereof above the end of said inlet pipe, substantially as described.

2. The combination of the trap, the vent and sewer pipes communicating therewith, the waste pipe entering said trap through an opening in its side below the upper end of the sewer pipe, the removable cap closing said opening and surrounding the waste pipe, and the packing ring and packing, forming a tight joint between the opening in said cap and the waste pipe but allowing the free adjustment of the latter without loosening the packing, substantially as specified.

3. The herein described trap consisting of a body A having a lateral T B screw threaded interiorly, the screw cap C having a rib c and flange C', the packing E, the packing ring D, in combination with the waste pipe entering the T, and sewer pipe communicating with the interior of the trap above the waste pipe, all constructed and arranged to operate substantially as described.

In testimony that I claim the foregoing as my own I affix my signature in presence of two witnesses.

NICHOLAS BARRY, Jr.

Witnesses:
JAMES R. MANSFIELD,
C. W. SEVILLE.